Jan. 24, 1967   C. F. STRAWN   3,300,649
LOWEST SIGNAL RESPONSIVE CONTROL SYSTEM
Filed April 25, 1963
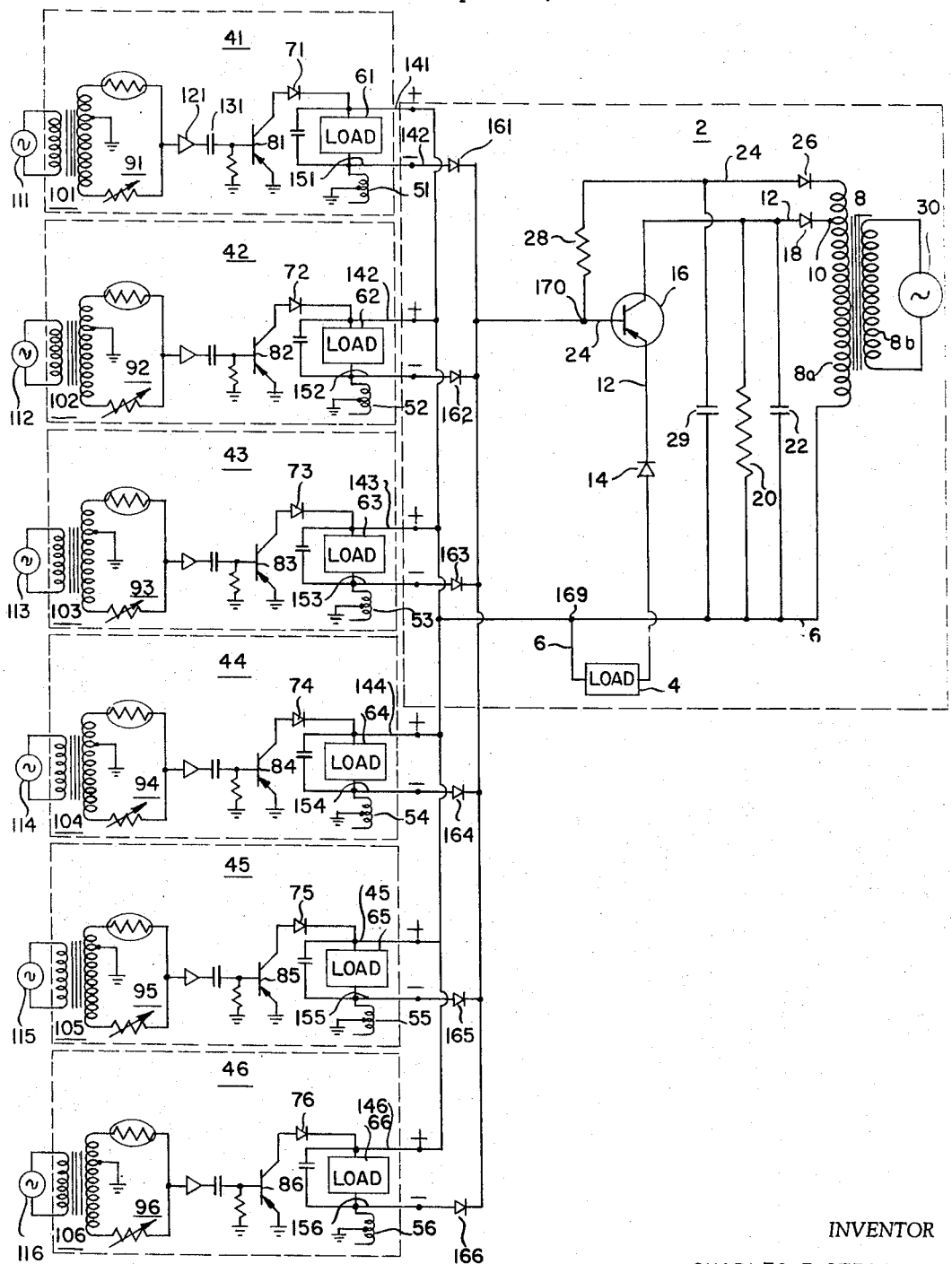
INVENTOR
CHARLES F. STRAWN
BY *Scrivener & Parker*
ATTORNEYS

United States Patent Office 3,300,649
Patented Jan. 24, 1967

3,300,649
LOWEST SIGNAL RESPONSIVE CONTROL SYSTEM
Charles F. Strawn, Arlington, Tex., assignor to Johnson Service Company, Milwaukee, Wis., a corporation of Wisconsin
Filed Apr. 25, 1963, Ser. No. 275,652
11 Claims. (Cl. 307—39)

This invention relates generally to a multi-channel control system operable in accordance with the lowest of a plurality of control signals, and more particularly to a control system including a plurality of auxiliary loads which are operable, respectively, in accordance with the deviations of conditions from predetermined values, and a main load which is operable as a function of the lowest of the control signals applied to the auxiliary loads at a given time.

In multi-zone heating and air-conditioning systems, a temperature modifying fluid is supplied from a main supply line to the various control zones through branch feeder lines. Main and branch regulators are provided in the main and branch lines, respectively, for achieving desired distribution of the temperature modifying fluid to the various zones. In automatic systems condition-responsive means are arranged in the various zones for operating the respective branch regulators to maintain the zones within predetermined temperature limits.

In certain installations it is desirable to vary the main regulator in accordance with the operation of one or more of the auxiliary or branch regulators. For example, if one of the branch regulators should be maintained in a fully open position for a reasonable period of time and the temperature of the zone associated therewith is not brought within the desired temperature range, adjustment of the main regulator is required to obtain the desired system performance.

The present invention relates to an automatic control system which is operable to vary the position of a main regulator in accordance with the operation of that condition-responsive zone control device which senses the lowest deviation of a condition from a predetermined value at a given time. For example, in a multi-zone system including three condition-responsive control means which have 75° F. set points and which sense, at a given time, zone temperatures of 72° F., 73° F., and 74° F., respectively, the system of the present invention is operable to vary the main regulator as function of the operation of the branch regulator which is controlled by the condition-responsive means which senses the 74° F. temperature. By the use of current-responsive electro-mechanical actuators for controlling the operation of the main and branch regulators, a completely electric automatic control system may be provided.

A primary object of the invention is to provide a control system including a current-responsive main load, a plurality of condition-responsive means each of which is operable to produce a control signal which is a function of the deviation of a condition from a predetermined value, and means for energizing said main load as a function of the lowest of the control signals generated by said condition-responsive means at a given time.

A more specific object of the invention is to provide a control system including a current-responsive main load, a plurality of current-responsive auxiliary loads, a plurality of condition-responsive means energizing said auxiliary loads, respectively, in accordance with the deviations of predetermined conditions from desired values, and means energizing said main load as a function of the lowest of the deviations sensed by said condition-responsive means at a given time. According to a specific feature of the invention, the means energizing said main load is operable only when all of the auxiliary loads are energized. In accordance with a further object of the invention, each of the auxiliary loads is energized only for deviations of a condition in one sense from a predetermined value.

A further object of the invention is to provide a control system comprising an emitter follower main load circuit including a current-responsive main load, a plurality of condition-responsive means each of which develops a direct-current control voltage which is a function of the deviation of a condition in one sense from a predetermined value, and means for energizing said main load as a function of the lowest of the control voltages generated by said condition-responsive means at a given time. According to the invention, the control voltages are isolated from each other and are connected, respectively, with current-responsive auxiliary loads. The main load is energized only when all of the auxiliary loads are energized. Consequently, while the auxiliary loads are continuously controlled by the associated condition-responsive means in a modulating manner, the main load is operable only when all of the auxiliary loads are energized.

Other objects and advantages of the invention will become apparent from a study of the following specification when considered in conjunction with the accompanying drawing, the single figure of which is an electrical schematic diagram of the multi-channel condition-responsive control system.

Referring to the drawing, the main load circuit 2 is of the emitter follower type including a current-responsive load 4 which is connected at one end by conductor 6 with one end of the secondary winding 8a of transformer 8. The other end of load 4 is connected with tap 10 of secondary winding 8a by a conductor 12 which includes diode 14, the emitter to collector circuit of transistor 16, and diode 18. Resistor 20 and capacitor 22 are connected between conductors 6 and 12 as shown. The free end of secondary winding 8a is connected with the base electrode of transistor 16 by conductor 24 which includes diode 26 and resistor 28, said resistor having a relatively high resistance value. Capacitor 29 is connected between conductors 6 and 24. The main load circuit 2 is energized by A.-C. voltage source 30 which is connected across primary winding 8b of transformer 8. The current-responsive load 4 constitutes a device (for example, an electro-mechanical actuator controlling a regulator arranged in the main conduit of a temperature-modifying system) which is operable—as will be described below—by the lowest signal produced by one of a plurality of condition-responsive control circuits 41–46. Since transistor 16 is of the PNP type, diodes 18 and 26 have polarities which isolate transistor 16 from the positive half cycles of the voltage developed by winding 8a.

Each of the control circuits 41–46 is of the type disclosed in the copending U.S. patent application of Billy Burley, Serial No. 206,348, filed June 29, 1962, entitled "Condition-Responsive Electronic System, now Patent Number 3,243,685." Control circuit 41 includes a load circuit comprising, in series, an alternating-current reference voltage source 51, a current-responsive auxiliary load 61, a diode 71, and the emitter to collector circuit of transistor 81. Condition-responsive bridge network 91, which is energized by transformer 101 and A.-C. voltage source 111, has an output terminal connected with the base of transistor 81 via amplifier 121 and capacitor 131. Reference voltage source 51 may comprise a grounded center-tapped auxiliary secondary winding of transformer 101 as described in the aforementioned Burley patent application. Similarly, control circuits 42–46 include reference voltage sources 52–56, current-responsive auxiliary loads 62–66, diodes 72–76, transistors 82–86, and condition-responsive bridges 92–96, respectively. Since transistors 81–86 are of the PNP type, diodes 71–76 are poled to isolate the positive half cycles of the reference voltages developed by windings 51–56. The bridges 91–96 are arranged at remote locations for measuring different conditions (for example, the temperatures of desired areas or zones). Current-responsive loads 61–66 may constitute electro-mechanical actuators controlling regulators arranged in branch line conduits of the temperature modifying system.

According to the present invention, means are provided for selectively connecting emitter follower main load circuit 2 with that control circuit having the lowest signal voltage at a given time. These circuit means include conductors 141–146 which are connected at one end with the ends of loads 61–66 adjacent diodes 71–76, respectively, and at the other end with the lower end of winding 8a via junction 169 and conductor 6. Conductors 151–156, containing equally poled diodes 161–166, connect the other ends of loads 61–66 with conductor 24 at junction 170 (between resistor 28 and the base electrode of transistor 16). It is to be noted that diodes 161–166 have the same polarity as diode 26 relative to the upper end of secondary winding 8a. With regard to reference voltage windings 51–56, however, diodes 161–166 and diodes 71–76, respectively, are of opposite polarity.

In accordance with conventional emitter follower operation, the emitter voltage of transistor 16 follows the base voltage appearing at junction 170 (minus a small base to emitter voltage drop). The large negative voltage developed at junction 170 is dependent upon the large resistance value of resistor 28. This resistance value is selected to provide a current source to the base electrode which is just sufficient—when the control circuits are disconnected from junctions 170 and 169—to turn the transistor on and bring the output up to its full value. Since the emitter is at a high negative voltage, a large voltage is developed across main load 4. If one of the control circuits (46, for example) were now connected across junctions 169 and 170, a branch current path is established which includes conductor 156, diode 166, load 66 and conductor 146. Part of the base to emitter current of transistor 16 is drained through this branch path until the voltage at the base equals the voltage developed by the branch current flow across load 66. Assuming that control circuit 46 is deactivated, if the resistance value of load 66 is low relative to the resistance of resistor 28, the voltage at junction 170 decreases to such a value that transistor 16 is non-conductive and main load 4 is de-energized. Upon the activation of control circuit 46 (to develop a D.-C. voltage across load 66 which is a function of the deviation of the condition sensed by bridge 96 from a predetermined value), the voltage at junction 170 goes more negative, the base and emitter voltages of transistor 16 go more negative, transistor 16 becomes conductive, and a voltage is developed across load 4 which is a function of the voltage developed across load 66.

If a second control circuit (41, for example) were now to be connected—in a deactivated state—across junctions 170 and 169, the voltage at junction 170 would again be lowered to a value to de-energize main load 4. Owing to te potential relationships of the voltages developed across loads 61 and 66, diodes 166 and 161 are reverse biased and forward-biased, respectively, and control circuit 46 no longer has any effect on the main load circuit 2. Upon activation of control circuit 41, a D.-C. voltage is developed across load 61 which is a function of the condition deviation sensed by bridge 91. If this voltage across load 61 is less than the voltage across load 66, diodes 166 and 161 remain reverse-biased and forward-biased, respectively. The voltage appearing at junction 170 becomes more negative, transistor 16 becomes conductive, and a voltage is developed across main load 4 which is a function of the voltage across load 61. However, if the conditions sensed by bridges 91 and 96 are such that the voltage developed across load 61 is greater than that developed across load 66, diodes 161 and 166 become reverse-biased and forward-biased, respectively, and a voltage is developed across load 4 which is a function of that developed across load 66. Consequently, when all of the control circuits connected across junctions 170 and 169 are activated, load 4 follows only the lowest load voltage developed across any of the control circuit loads. Because of the reverse-biasing of the diodes, the remaining control circuit load voltages are isolated and have no effect over main load circuit 2. If any of the control circuits connected across junctions 170 and 169 are deactivated, main load 4 is de-energized.

*Operation*

Assume that bridges 91–96 are temperature responsive bridges each having a set point of 75° F. Assume further that the instantaneous phase relationships between the bridge-energizing secondary windings of transformers 101–106 and the reference voltage windings 51–56, respectively, are such that loads 61–66 are de-energized when the temperatures sensed by bridges 91–96, respectively, exceed 75° F. For the sake of simplicity, assume that transistors 81–86 are biased to cut-off.

When all bridges 91–96 sense zone temperatures equal to or greater than 75° F., all loads 61–66 are deactivated (since the phase relationship between the control and reference voltages causes transistors 81–86 to be nonconductive). Assuming that the resistance values of loads 61–66 are low relative to the value of resistor 28, the negative voltage at junction 170 drops below the value required to overcome the base to emitter drop of transistor 16 and the drop across diode 14, and consequently load 4 is also de-energized.

Assume now that each of the bridges 91–95 senses a zone temperature of 73° F., and that bridge 96 senses a zone temperature of 76° F. Bridge 96 develops a signal which is a function of the 1° F. deviation from set temperature, but since this signal, when amplified and applied to the base of transistor 86, is out of phase with the negative half-cycles of the reference voltage appearing across the emitter to collector circuit, transistor 86 is non-conductive and load 66 is de-energized. On the other hand, the amplified signals applied to the bases of transistors 81–85 are in phase with the negative half-cycles of the respective reference voltages, and consequently these transistors become conductive. The effective D.-C. currents flowing through loads 61–65 are a function of the 2° F. deviation between zone temperatures and set temperatures, and the respective electro-mechanical actuators operated by the loads assume positions dependent upon the 2° F. temperature deviation. Since load 66 is de-energized, diode 166 is forward-biased and diodes 161–165 are reverse-biased. Since the voltage appearing at junction 170 is less than the value required to overcome the base to emitter drop and the drop across diode 14, main load 4 remains de-energized. It is apparent, therefore, that load 4 can never become energized if any one of the loads 61–66 is de-energized. In other words, load 4 can be energized only when all of the bridges 91–96 sense temperatures lower than 75° F. and voltages are developed across all of the loads 61–66.

Assume now that bridges 91–95 continue to sense a temperature of 73° F. and that bridge 96 senses a temperature of 74° F. Loads 61–65 continue to be energized as a function of the 2° F. temperature deviation, and load 66 is now energized as a function of the 1° F. temperature deviation. Owing to potential relationship between the voltage drop across load 66 relative to the drop across loads 61–65, diodes 161–165 continue to be reverse-biased and diode 166 remains forward-biased. The voltage at junction 170 becomes more negative as a function of the 1° F. deviation sensed by bridge 96, and assuming that this base voltage is sufficient to cause energization of load 4, load 4 is energized in accordance with the 1° F. deviation. Thus, when all control circuits 41–46 are activated, the regulator operated by load 4 assumes a position which is dependent upon the lowest deviation sensed by bridges 91–96.

If the temperature sensed by bridge 96 should decrease to 73° F., all bridges now sense the same temperature and equal currents flow through loads 61–66. All diodes 161–166 are now forward biased, and a current flows through load 4 which is a function of the 2° F. deviation.

If bridge 96 should now detect a temperature of 72° F. and if bridges 91–95 should continue to sense a temperature of 73° F., load 66 is energized as a function of the 3° F. deviation and and loads 61–65 are energized as a function of the 2° F. deviation. Diode 166 becomes reverse-biased to isolate control circuit 46, and main load 4 is energized as a function of the 2° F. deviation (i.e., the lowest of the deviations at a given time).

If bridge 91 should now sense a temperature of 74° F., if bridges 92–95 sense a temperature of 73° F., and if bridge 96 senses a temperature of 72° F., diodes 162–166 become reverse-biased, diode 161 becomes forward biased, and loads 61 and 4 are energized as a function of the 1° F. deviation. Loads 62–65 are energized in accordance with the 2° F. deviation, and load 66 is energized in accordance with a 3° F. deviation.

As indicated above, in the electronic control of the present invention, modulating control over main load 4 is obtained by that condition-responsive circuit 41–46 which has the lowest load current at any given time (i.e., that circuit which senses the smallest temperature deviation of its temperature bridge). By appropriate reversal of the phase relationships between reference voltage windings 51–56 and the energizing windings of bridges 91–96, the sense of response of the deviations from set temperature is reversed. Consequently, for summer-winter change-over, the load 4 may be operated as a function of the lowest temperature deviation senses by bridges 91–96 above set point.

While in accordance with the provisions of the patent statutes the preferred form of the invention has been illustrated and described, it will be apparent to those skilled in the art that changes may be made in the disclosed apparatus without deviating from the invention set forth in the following claims.

What is claimed is:

1. A condition-responsive multi-channel control system, comprising
   a current-responsive main load;
   a plurality of condition-responsive means each of which is operable to generate a control voltage having a magnitude which is a proportional function of the deviation of a condition from a predetermined value, said condition-responsive means being arranged to sense different conditions;
   and means proportionately energizing said main load as a function of the magnitude of the lowest of the control voltages generated by the condition-responsive means at a given time.

2. Apparatus as defined in claim 1 wherein said main load energizing means is operable only when a control voltage is produced by each of said condition-responsive means.

3. Apparatus as defined in claim 2, wherein each of said condition-responsive means is operable to produce a control voltage only for condition deviations in one sense from a predetermined value.

4. A multi-channel control system comprising
   a current-responsive main load;
   a plurality of control circuits each of which includes a current-responsive auxiliary load, and condition-responsive means for applying a control signal to said auxiliary load, said control signal having a magnitude which is a proportional function of the deviation of a condition from a predetermined value, the condition-responsive means of said control circuits being arranged to sense different conditions;
   and circuit means connected to said condition responsive means developing a voltage across said main load which has a magnitude which is a function of the lowest of the control signals applied to said auxiliary loads at a given time.

5. The multi-channel control system of claim 4 and separate diode means connected between each of the auxiliary loads and the circuit means and operable to isolate all of the condition responsive means from the circuit means until all of the auxiliary loads are energized and thereafter developing said voltage across said main load which is a function of the lowest of the auxiliary load voltages at a given time.

6. A multi-channel control system, comprising
   a current-responsive main load;
   a plurality of current-responsive auxiliary loads;
   a plurality of condition-responsive control means connected, respectively, with said auxiliary loads, each of said control means including a condition sensing means and being operable to develop across the corresponding auxiliary load a direct-current control voltage of an amplitude which is a proportional function of the deviation of the corresponding condition from a predetermined value, each of said condition-responsive control means being arranged to sense a different condition;
   and transistor means connected in an energizing circuit for said main load, said transistor being connected to said condition responsive control means and actuated as a function of the lowest of said control voltages at any given time to modulate the energization of the main load in accordance with the amplitude of the corresponding control voltage.

7. Apparatus as defined in claim 6 wherein said condition responsive means is connected to the transistor means by diode means to actuate the transistor only when all of the auxiliary loads are energized and applying a direct-current voltage across said main load which is a function of the lowest of said control voltages.

8. Apparatus as defined in claim 7 wherein each of said condition-responsive means is operable to energize the auxiliary load only in response to deviations in a given condition in one sense from a predetermined value, the associated auxiliary load being deenergized for condition deviations in the opposite sense.

9. Apparatus as defined in claim 7 wherein said means for energizing said main load includes said transistor means connected in an emitter follower circuit means and having an emitter electrode connected with one terminal of said main load, and resistor means applying a biasing potential to a base electrode of said transistor means for causing activation of said emitter follower circuit means, said base electrode being further connected to the condition responsive means with said diode means isolating the auxiliary load control voltages from each other and isolating the emitter follower main load circuit from all of the auxiliary loads other than the auxiliary load across which the lowest condition responsive control voltage is developed.

10. Apparatus as defined in claim 9 wherein said transistor means is provided with a D.C. bias circuit including a transformer having an output winding a portion of which is connected across the emitter to collector electrodes of the transistor in series with suitable diode means and the base being connected to the transformer in series with an impedance and a diode, said impedance establishing a current source to the base electrode which is sufficient in the absence of other control signals to turn the transistor fully on, said auxiliary loads and associated diodes being connected to provide a bypass current path from said base electrode and thereby providing control of the current supplied to said base electrode in accordance with the lowest impedance load, said loads having impedances low relative to said impedance means.

11. Apparatus as defined in claim 10 wherein each of said auxiliary loads is connected in circuit with an alternating current source, a diode and a current modulating transistor, said transistor having an input element connected to a condition responsive sensing means and providing a modulation of the conductivity of the transistor in accordance with variations in the output of the sensing means in phase with the alternating current half cycle passed by the diode means, said loads being connected in series with the corresponding diode across a set of input means to said emitter follower circuit means to provide a plurality of current bypass shunt paths from said base electrode.

References Cited by the Examiner

UNITED STATES PATENTS

| | | |
|---|---|---|
| 2,235,620 | 3/1941 | Nessell. |
| 2,401,025 | 5/1946 | Smith. |
| 2,788,941 | 4/1957 | Crysler. |
| 2,888,578 | 5/1959 | Bruce. |
| 3,091,737 | 5/1963 | Tellerman. |
| 3,130,319 | 4/1964 | Burley _____ 307—39 X |
| 3,134,542 | 5/1064 | Smith _____ 236—1 X |
| 3,157,247 | 10/1964 | Carlson _____ 236—1 X |
| 3,166,246 | 1/1965 | Fielden _____ 236—1 |
| 3,182,205 | 5/1965 | Sorrells. |
| 3,185,080 | 5/1965 | Spitsbergen. |
| 3,193,704 | 7/1965 | Chueh. |
| 3,217,173 | 11/1965 | Strohmeier _____ 307—88.5 |
| 3,231,750 | 1/1966 | Burley _____ 307—39 |

ORIS L. RADER, *Primary Examiner.*

T. J. MADDEN, *Assistant Examiner.*